N. H. COOKSEY.
PLOW ATTACHMENT.
APPLICATION FILED JAN. 15, 1915.
1,172,946.
Patented Feb. 22, 1916.
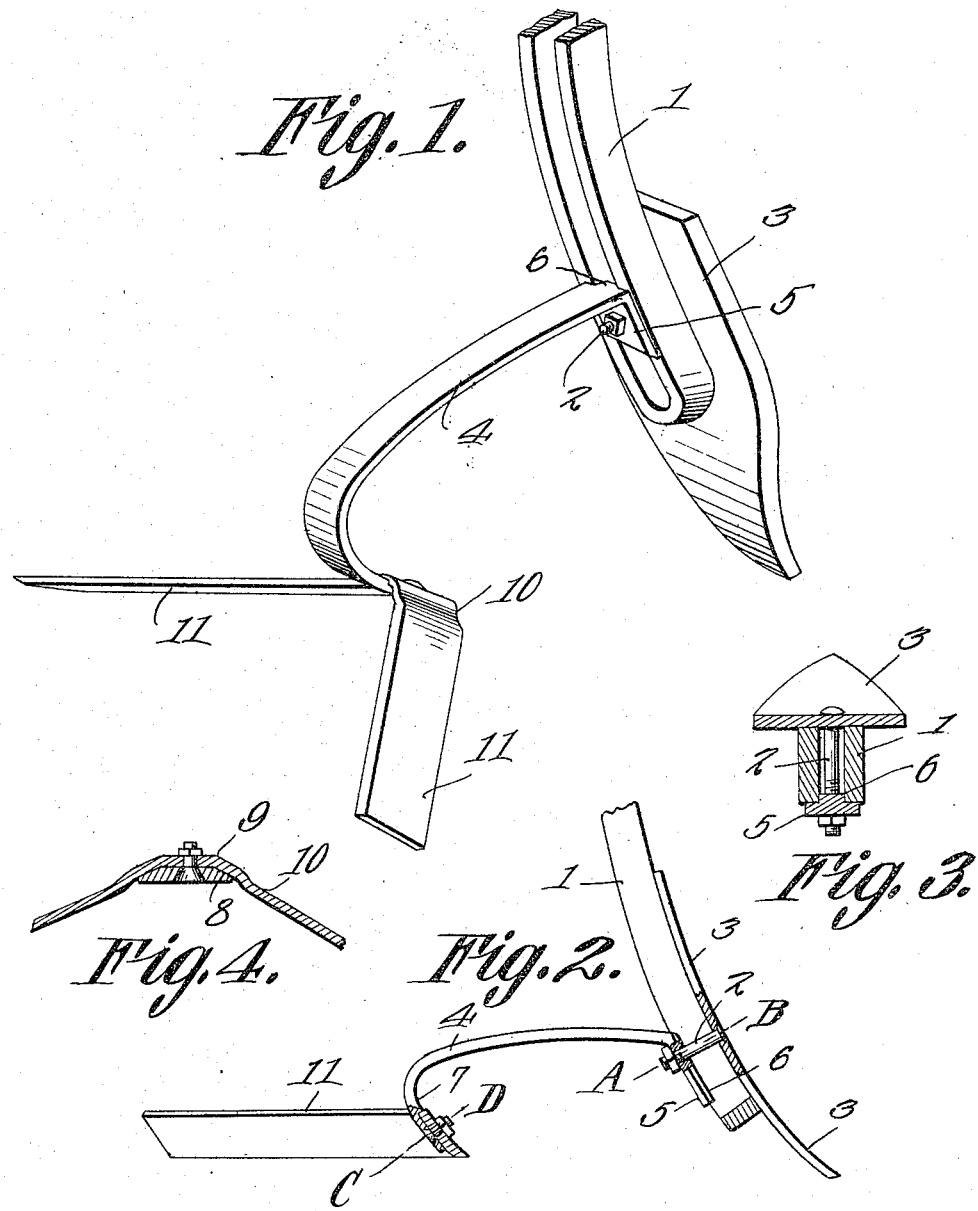
Witnesses
N. H. Cooksey, Inventor,
by ———— Attorneys.

UNITED STATES PATENT OFFICE.

NATHANIEL H. COOKSEY, OF COSTELOW, KENTUCKY.

PLOW ATTACHMENT.

1,172,946. Specification of Letters Patent. Patented Feb. 22, 1916.

Application filed January 15, 1915. Serial No. 2,442.

*To all whom it may concern:*

Be it known that I, NATHANIEL H. COOKSEY, a citizen of the United States, residing at Costelow, in the county of Logan and State of Kentucky, have invented a new and useful Plow Attachment, of which the following is a specification.

This invention relates to an attachment for plows or cultivators, one of the objects of the invention being to provide means whereby, in the cultivation of corn or the like, the soil after being loosened between the rows by an ordinary bull tongue, can be piled up upon the rows before becoming dry so that the greater proportion of moisture contained within the loosened soil will be conserved, thus rendering the improvement especially designed for use in those regions having but little rainfall.

A further object is to provide an attachment of this character which is cheap to manufacture, can be readily applied, and which is durable and efficient.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a perspective view of the attachment applied to the standard of a cultivator shovel or bull tongue. Fig. 2 is a side elevation of the structure shown in Fig. 1, the sweep being shown in section. Fig. 3 is an enlarged section on line A—B Fig. 2. Fig. 4 is an enlarged section on line C—D Fig. 2.

Referring to the figures by characters of reference 1 designates a standard of a cultivator or the like, the same being of that type having spaced side members forming a slot therebetween for the reception of a bolt 2 used for attaching the shovel 3 to the standard. This bolt is adapted likewise to engage the front end portion of the attachment constituting the present invention. As shown in the drawings this attachment consists of a bar 4 slightly bowed from end to end and provided, at its front end, with a depending tongue 5 having its front and back faces flat, the front face being formed with a longitudinal rib 6 adapted to fit snugly within the slot between the sides of standard 1. Furthermore this tongue 5 has an opening for the reception of the bolt 2 so that by tightening the bolt the tongue 5 and the shovel 3 will be clamped tightly against opposite faces respectively of the standard 1. The rear end portion of the bar 4 merges into a downwardly and forwardly curved extension 7 the front face of which is preferably beveled, as shown at 8. This extension is adapted to be straddled by the intermediate portion 9 of a sweep 10, the said sweep being formed with oppositely disposed wings diverging rearwardly as shown at 11.

In using the device the same is to be drawn between rows of corn or the like and as the shovel or point 3 loosens the soil, the sweep following thereafter will scrape the soil laterally onto the rows before it has a chance to dry, with the result that the moisture contained within the loosened soil will be retained.

Importance is attached to the fact that this device can be applied readily to cultivators already in use and renders them especially advantageous in semi-arid regions where it is of the utmost importance that all moisture possible be conserved in the cultivation of crops.

It will be noted that by providing the attachment constituting the present invention, the plow point or shovel will be guided straight on the side of a hill. Various other advantages will be apparent to those skilled in the art.

What is claimed is:—

The combination with a standard and a shovel bearing against one face thereof, of a bar having a depending tongue at one end engaging the other face of the standard, means upon said depending end for projection into the standard to hold the bar against lateral displacement relative thereto, means extending through said depending end portion, the standard and shovel for binding them together, said bar having a downwardly and forwardly extending rear end portion, and a sweep carried by said rear end portion.

In testimony that I claim the foregoing as my own, I have hereto affixed my signature in the presence of two witnesses.

NATHANIEL H. COOKSEY.

Witnesses:
GRIDER CLAY,
A. T. JONES.

Copies of this patent may be obtained for five cents each, by addressing the "Commissioner of Patents, Washington, D. C."